United States Patent [19]
Welscher

[11] Patent Number: 5,463,803
[45] Date of Patent: Nov. 7, 1995

[54] METHOD OF ASSEMBLING A CONTROL HAVING A BODY MEMBER AND A COVER MEMBER WITH AN ACCESS APERTURE THEREIN

[75] Inventor: William L. Welscher, Ames, Iowa

[73] Assignee: Sauer Inc., Ames, Iowa

[21] Appl. No.: 315,547

[22] Filed: Sep. 30, 1994

Related U.S. Application Data

[62] Division of Ser. No. 49,988, Apr. 16, 1993, Pat. No. 5,378,127.

[51] Int. Cl.$^6$ .................................................. B23P 15/00
[52] U.S. Cl. ............................ 29/467; 29/464; 29/468; 74/60
[58] Field of Search .......................... 29/464, 468, 525.1; 417/506; 74/60

[56] References Cited

U.S. PATENT DOCUMENTS

| | | | |
|---|---|---|---|
| 2,531,428 | 11/1950 | Hautzenroeder | 60/388 |
| 3,407,738 | 10/1968 | Bosch | 417/218 |
| 3,938,401 | 2/1976 | Bauer | 92/122 |
| 3,993,418 | 11/1976 | Simmons | 418/206 |
| 4,087,970 | 5/1978 | Slazas et al. | 74/60 |
| 4,630,956 | 12/1986 | Gilbreath | 29/464 |
| 4,671,492 | 6/1987 | Strunk | 29/468 |
| 5,072,506 | 12/1991 | Dacey, Jr. | 29/464 |
| 5,122,037 | 6/1992 | Myers et al. | 417/222 |
| 5,226,349 | 7/1993 | Alme et al. | 91/112 |
| 5,241,872 | 9/1993 | Betz et al. | 74/60 |
| 5,378,127 | 1/1995 | Welscher | 417/506 |

*Primary Examiner*—Irene Cuda
*Assistant Examiner*—Marc W. Butler
*Attorney, Agent, or Firm*—Zarley, McKee, Thomte, Voorhees, & Sease

[57] ABSTRACT

A control assembly for hydrostatic transmission having a valve controlling the flow of fluid to the pump includes a pump body member having a cavity with a moveable valve element mounted in the body and connected to a fluid pressure source, and having a neutral position. Linkage including an upstanding pin interconnects the pump to the valve element. A cover extends over the body and is secured thereto. A control shaft extends through the cover having an exterior end with a manual control lever mounted thereon, and an interior end to which a cam plate having an elongated cam slot therein is secured. A detent portion in the cam slot opposite to the upstanding pin defines a neutral position for the pin. A screw adjusts the valve element into a neutral position. A torsional spring in the cover yieldingly holds the control shaft, the control lever, the cam plate, the valve element, and the remainder of the linkage in a neutral position. The method of assembling the control assembly involves placing an elongated alignment tool on the upstanding pin and moving the tool into a prepositioned cam slot detent, placing the cover on said body and extending said tool through an aperture in the cover; securing the cover to the body, and removing the tool.

1 Claim, 4 Drawing Sheets

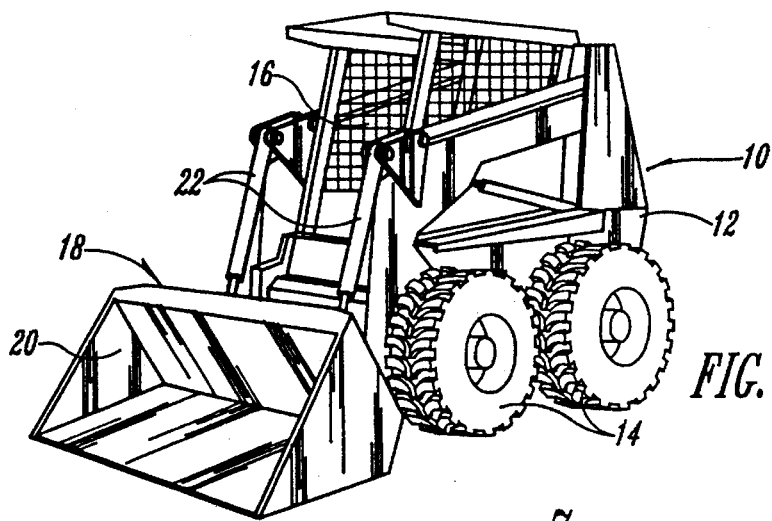
FIG.1
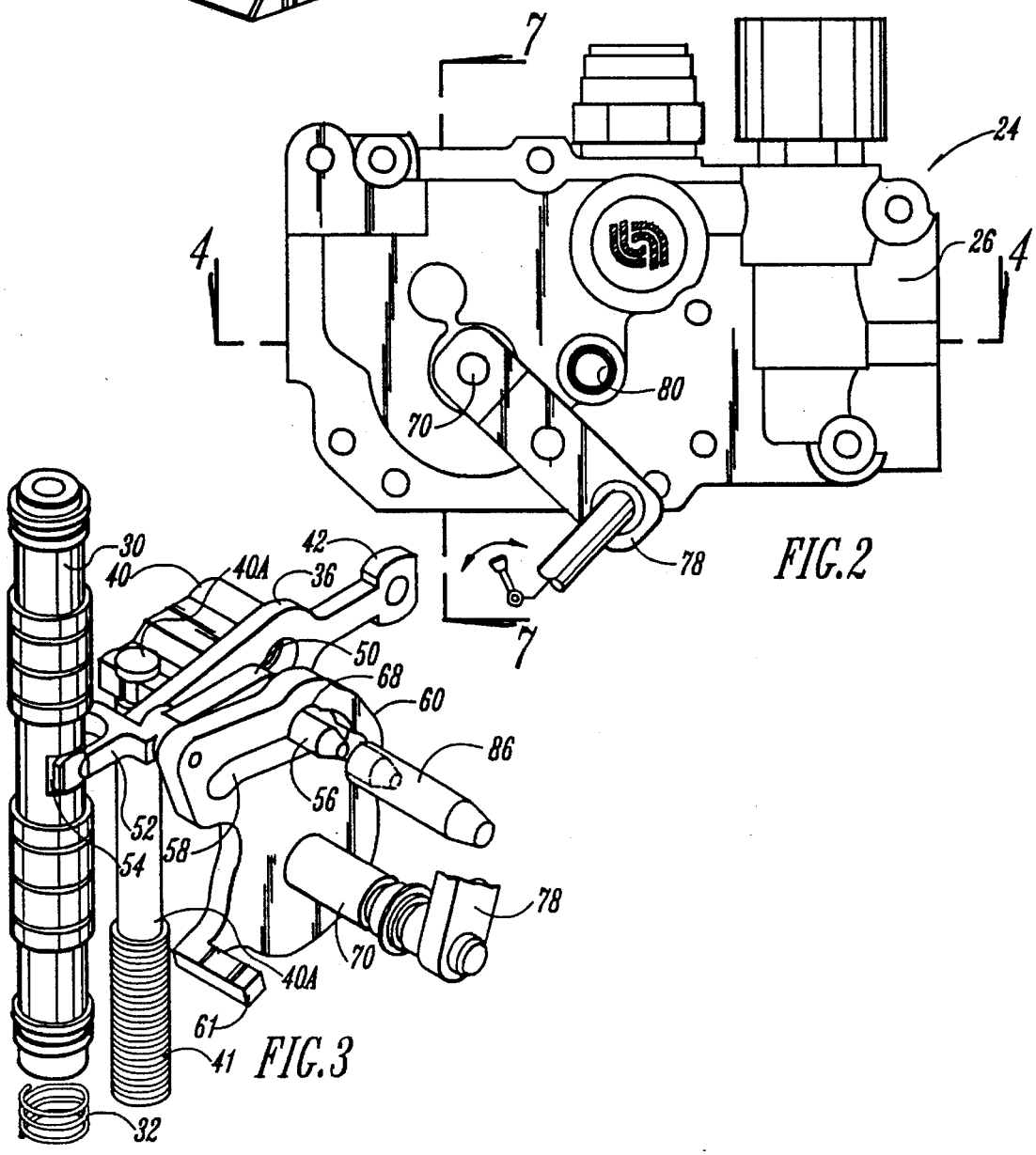
FIG.2
FIG.3

METHOD OF ASSEMBLING A CONTROL HAVING A BODY MEMBER AND A COVER MEMBER WITH AN ACCESS APERTURE THEREIN

This is a divisional of U.S. application Ser. No. 08/049,988 filed Apr. 16, 1993 now U.S. Pat. No. 5,378,127.

BACKGROUND OF THE INVENTION

Dual path vehicles require two hydrostatic transmissions per vehicle. One transmission drives the left propel wheels or track, and the other transmission drives the right propel wheels or track. Each transmission has a separate control lever to stroke the transmission for the operator command station. Thus, if the operator pushes both control levers forward an equal amount, the operator expects both transmissions to provide the same output so the vehicle will go straight ahead. If one transmission provides a greater output than the other, the vehicle will began to steer to one side or the other. The symmetry from the left to the right transmission is the most important when the operator is leaving neutral and when the operator reaches full stroke. Near neutral is important because if the operator is trying to inch forward very precisely, both transmissions should (left propel and right propel) start moving at the same time. If they do not move at the same time the vehicle will index to one side making it very difficult to do precise inching. Likewise with the handle at maximum angle, both transmissions need to have the same output or the vehicle will not go straight, but tend to steer opposite to the transmission with the greatest output.

Symmetry is also important on single mode transmissions to a lesser degree. The user expects equal output from the transmission regardless of whether the handle is moved in the forward or reverse direction.

To meet desired requirements of a larger neutral dead band and smooth control near the neutral position, it is desirable to incorporate a cam to tailor the movement of the valve spool relative to input handle. This tailored movement will optimize the vehicle controllability. It is also desirable to spring center the input handle to isolate any clearance or backlash in the vehicle control linkage from affecting the performance of the transmission.

However, spring centering the handle can create a problem with symmetry from forward to reverse. If the transmission control linkage or hydraulic valve spool are adjusted to ensure that the spool is centered in the neutral porting position, it does not assure that the handle is centered in the cam dead band. Likewise, if the handle is centered, this does not assure that the spool is centered.

When such vehicles are going downhill, the hydraulic motor in the transmission starts pumping oil to the pump. This backlash action causes the motor to override the pump and the vehicle speeds up. This can be counteracted by the valve spool in the hydraulic control, but the spool is slow to react because of accumulated tolerances in the control linkages and in the linkage on the equipment.

It is therefore a principal object of this invention to symmetrically center the control handle of the hydrostatic transmission control, and to eliminate all accumulated tolerances in the linkage system.

A further object of this invention is to provide a method of assembly of the hydraulic transmission controls which will precisely center the control lever in the center of the dead band.

These and other objects will be apparent to those skilled in the art.

SUMMARY OF THE INVENTION

The control assembly for hydrostatic transmissions of this invention includes a pump and a valve element to control flow of hydraulic fluid to the pump. The control assembly includes a body member having a cavity with a moveable valve element mounted in the body and connected to a source of hydraulic fluid under pressure, and, having a neutral position. Linkage means including an upstanding pin interconnects the pump to the valve element. A cover member extends over the body member and is secured thereto. A control shaft extends through the cover member and has interior and exterior ends. A manual control lever is mounted on the exterior end of the control shaft, and a cam plate is secured to the interior end of the control shaft. The cam plate has an elongated cam slot therein. A detent portion is located in the cam slot and receives a guide sleeve to define a neutral position whereby the upstanding pin will also be in a neutral position.

A resilient torque spring in the cover yieldingly holds the control shaft, the control lever, the cam plate, and the remainder of the linkage means in a neutral position. The neutral position of the valve element is determined by an adjustment screw.

The method of assembly of the control assembly involves placing an elongated alignment tool on the upstanding pin, moving the alignment tool into the detent of the cam to orient the upstanding pin in a neutral position, placing the cover member on said body member and extending said tool through an access aperture in the cover member; securing the cover member to the body member, and removing the alignment tool.

BRIEF DESCRIPTION OF THE DRAWINGS

FIG. 1 is a perspective view of a skid loader which is a typical vehicle upon which this invention is used;

FIG. 2 is a plan view of the control assembly;

FIG. 3 is a partial perspective view of the hydraulic valve spool and related control linkage elements;

DESCRIPTION OF THE PREFERRED EMBODIMENT

Figure 4:
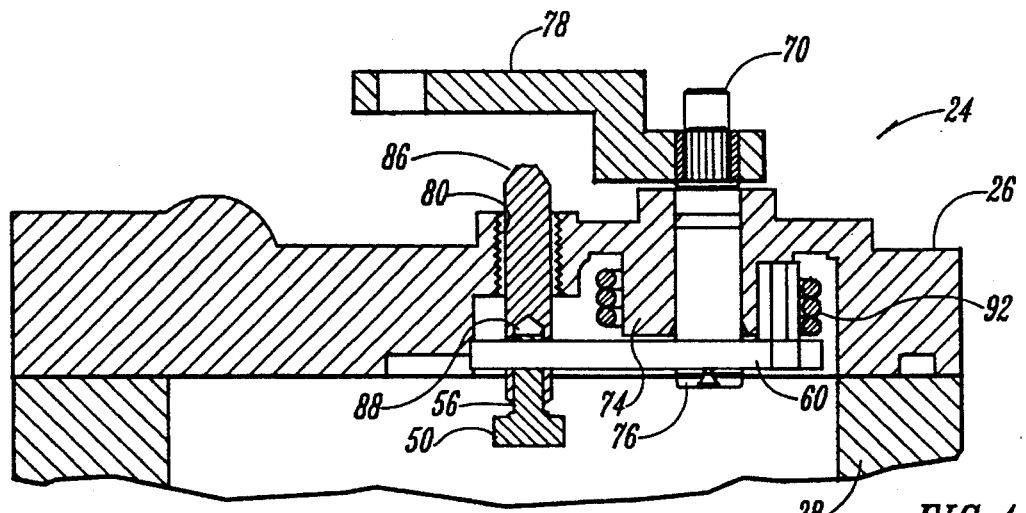
FIG. 4 is an elongated sectional view taken through the central assembly cover during assembly, as taken on line 4—4 of FIG. 2.

The numeral 10 designates a conventional skid loader which typically would employ this invention. The skid loader 10 has a frame 12 with two wheels 14 on each side, a cab for the operator, and a typical front end loader 18 comprised of a bucket 20 and hydraulic cylinders 22. Skid loader 10 normally will have the wheels 14 on opposite sides thereof driven by separate hydrostatic transmissions. The manual displacement control for hydrostatic transmissions of this invention will be applicable to such a vehicle.

Figure 6:
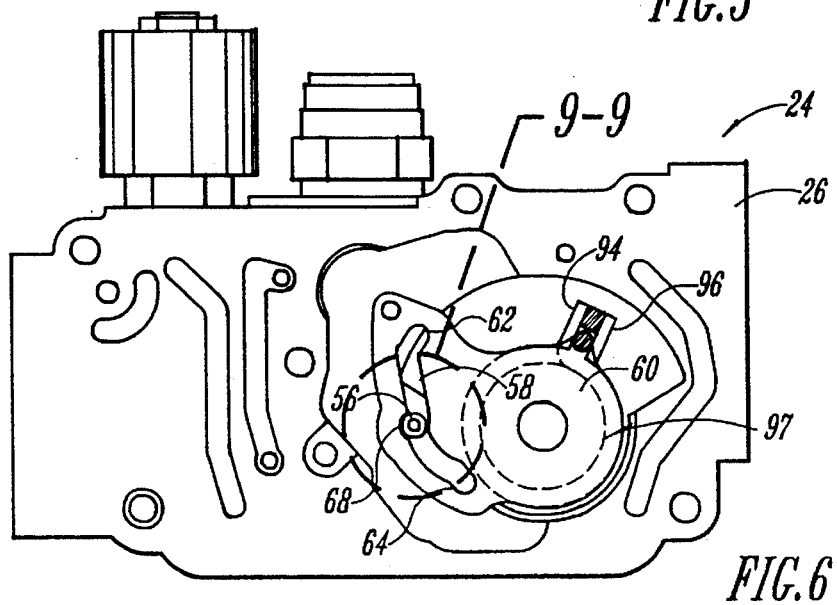
FIG. 6 is a plan view similar to that of FIG. 2 but with the control assembly cover removed.
Figure 7:
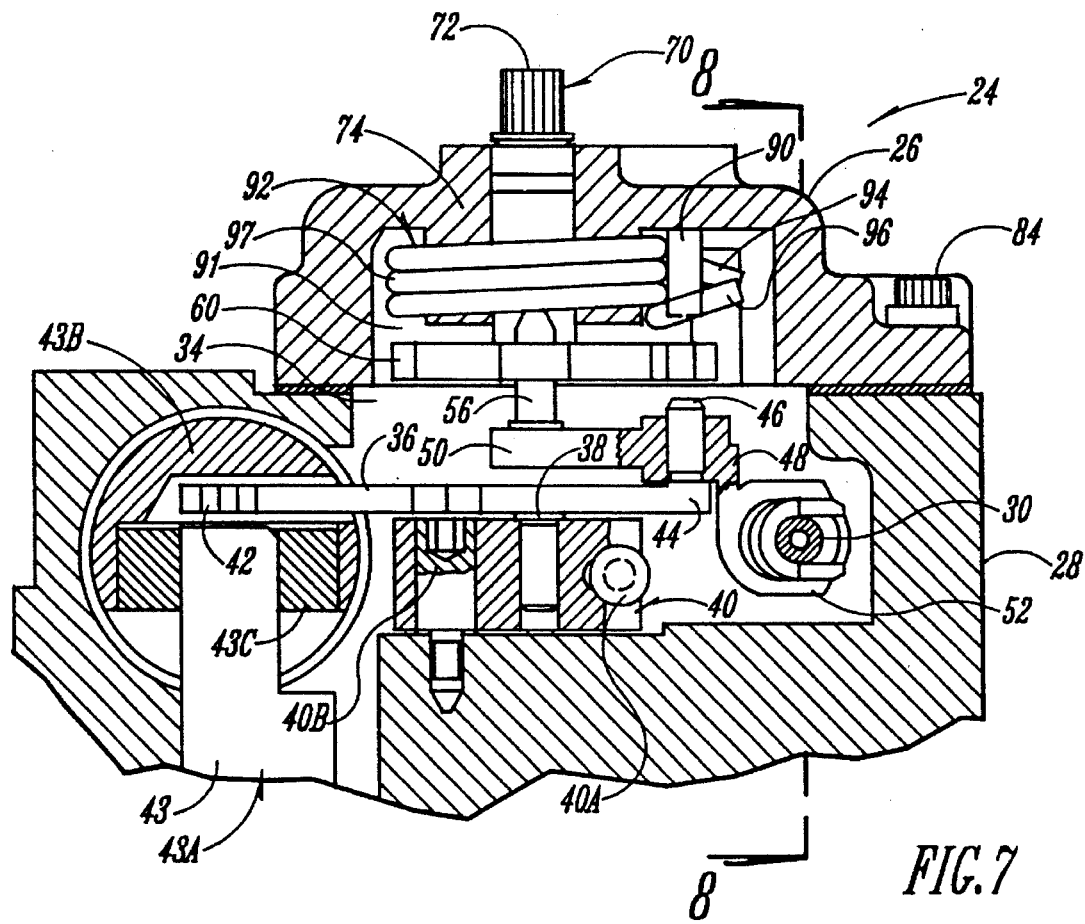
FIG. 7 is a sectional view taken on line 7—7 of FIG. 2.
Figure 8:
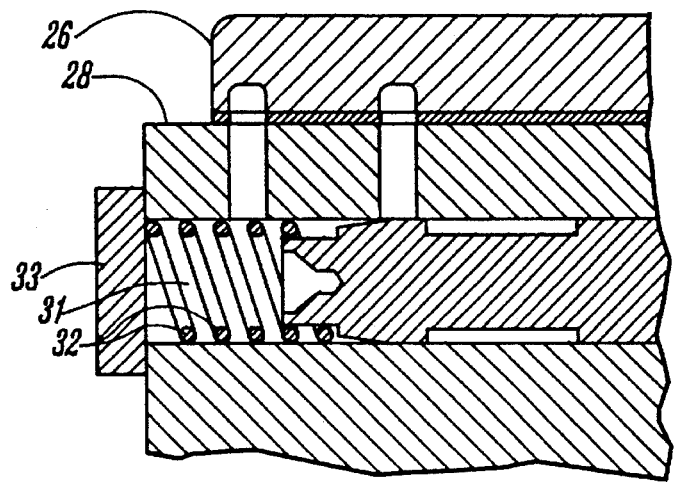
FIG. 8 is a partial sectional view taken on line 8—8 of FIG. 7.

Manual displacement control assembly 24 includes a control assembly cover 26 (FIGS. 2, 4, 5 and 6) and a pump body 28 (FIGS. 7 and 8). A conventional valve spool 30 is slideably mounted in a suitable bore 31 (FIG. 8) in body 28 (FIG. 7) and should have spring 32 (FIG. 3) mounted on one end thereof so that the spring can remove the backlash from the linkage. As discussed hereafter, spring 32 will serve to take the slack out of the linkage system whereby the hydrostatic transmission is controlled.

A cavity 34 (FIG. 7) appears in body 28 and contains a horizontal arm 36 (FIGS. 3 and 7) which is pivotally connected at 38 to body assembly 40. End 42 of arm 36 (FIGS. 3 and 7) is connected to a conventional swashplate 43 of transmission pump 43A. The numeral 43B designates the servo piston of the pump, and the numeral 43C designates a bearing for swashplate 43. End 44 of arm 36 has a first upstanding pin 46 which is pivotally mounted in bearing 48 of horizontal arm 50 (FIG. 7). A horizontal U-shaped connector 52 engages planar sides 54 (FIG. 3) of valve spool 30 so as to conventionally move spool 30 in a longitudinal direction to effect and control the flow of hydraulic fluid in the mechanism.

A second upstanding pin 56 extends from arm 50 and extends through an elongated cam slot 58 in cam plate 60 (FIGS. 3 and 6). Cam slot 58 has ends 62 and 64 with a centrally located arcuate detent 68 on one side thereof as best shown in FIGS. 3 and 6. The adjustment screw 40A is threaded into the body 28 by threads 41. Rotation of the adjustment screw will pivot assembly 40 (FIG. 7) around screw 40B (FIG. 7). As assembly 40 pivots around screw 40B, pin 38 (FIG. 7) moves back and forth and via arm 36 and arm 50, the spool (30) is centered in the neutral porting position.

Figure 5:
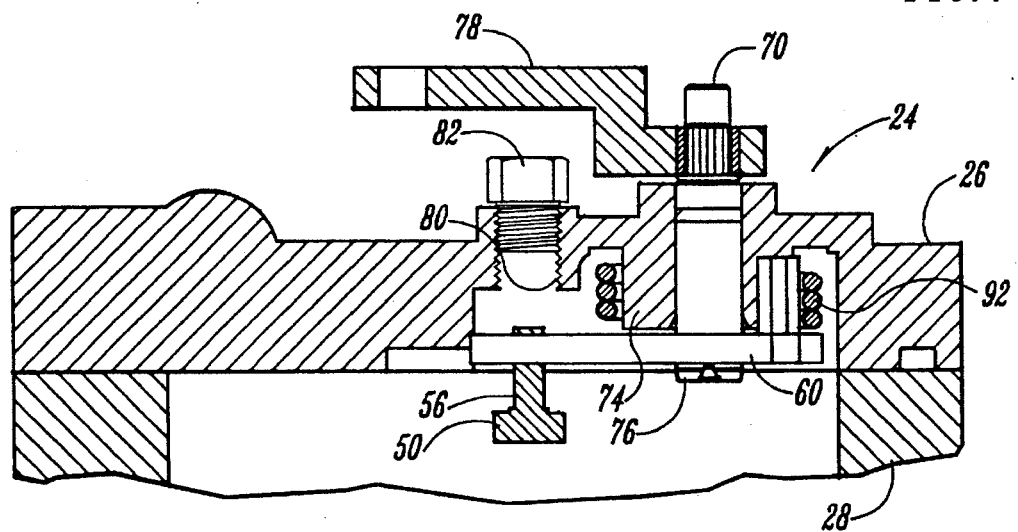
FIG. 5 is a sectional view similar to that of FIG. 4 after assembly is completed.

With reference to FIGS. 4, 5 and 7, a vertical disposed control lever shaft 70 extends downwardly through a sealable aperture in cover 26. Shaft 70 has an upper end 72 which protrudes from the cover 26 and has suitable serrations therein. Shaft 70 extends downwardly through an annular boss 74 in cover 26 and is rotatable within the boss. The lower end of shaft 70 is rigidly secured at 76 to cam plate 60. A suitable handle control 78 is mounted on the upper end 72 of shaft 70.

With reference to FIGS. 2, 4 and 5, a threaded aperture 80 appears in cover 26 and is adapted normally to be closed by screw plug 82 as shown in FIG. 5. A plurality of retention bolts 84 (see FIG. 7) are adapted to secure cover 26 to body 28.

An elongated guide sleeve 86 has an aperture 88 in the lower end thereof which can be inserted over pin 56. As described hereafter, when plug 82 is removed from threaded aperture 80, guide sleeve 86 can be extend through aperture 80 as shown in FIG. 4 when the cover 26 is mounted on body 28.

With reference to FIG. 7, a pin 90 extends downwardly into the cavity 91 which surrounds boss 74. A torsion spring 92 is mounted on boss 74 and has opposite ends 94 and 96 which are bent slightly towards each other but which are laterally spaced apart from each other. As seen in FIG. 6, ends 94 and 96 extend outwardly from the body 97 of spring 92 in a parallel direction. Ends 94 and 96 embrace the sides of downwardly extending pin 90 as well as the upwardly extending tang 61 which is a part of cam plate 60. This arrangement of structure fixes the cam plate 60 in a neutral position. Also, torsion spring 92 returns the spool 30 to neutral porting position.

The detent 68 is so positioned in cam slot 58 that it will maintain the pin 56 in the neutral position of the cam plate 60 when the guide sleeve 86 is nestled in detent 68.

With reference to FIG. 2, the control handle 78 is normally moved from the position shown in FIG. 2 in a clockwise direction approximately 33 degrees to effect movement of the vehicle in a first direction, and is moved in a counter-clockwise direction from the position in FIG. 2 to effect movement of the vehicle in an opposite direction. A dead band zone of handle 78 is defined as an arc of approximately one half to one and one half degrees in either direction from the neutral position shown in FIG. 2 wherein no movement of the vehicle will take place in either direction.

Figure 9:
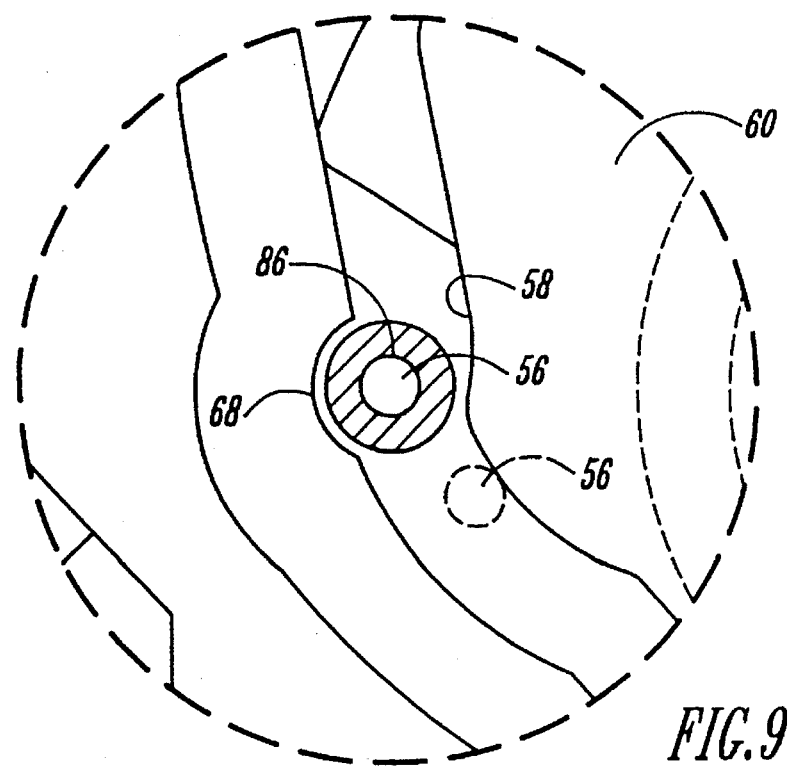
FIG. 9 is an enlarged scale partial plan view of a portion of FIG. 6 when the guide sleeve is inserted.
Figure 9A:
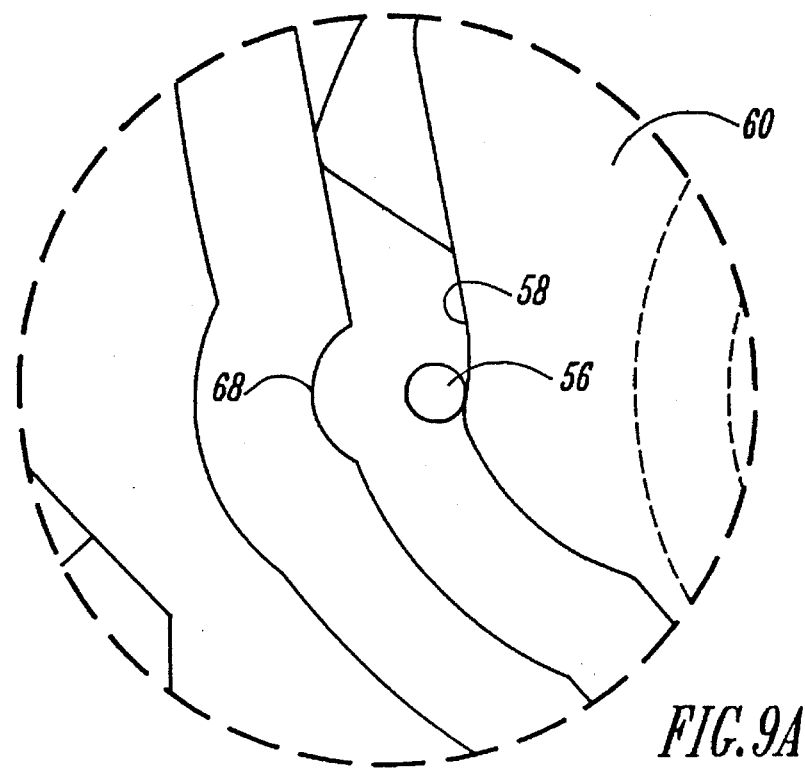
FIG. 9A is a plan view similar to FIG. 9 with the guide sleeve removed.

Before the cover 26 is placed on body 28, guide sleeve 86 is mounted on the upper end of pin 56 as shown in FIG. 4. Thus, if pin 56 is misaligned as shown by the dotted lines in FIG. 9, guide sleeve 86 will draw pin 56 to the neutral position seen in FIG. 9A opposite detent 68. Spring 32 acting through spool 30, connector 52 and arm 50 holds pin 56 against the inner edge of cam slot 58. The guide sleeve 86 is used to align the cam 60 during installation to the center of the dead band zone as described above and as depicted by the position of handle 78 in FIG. 2. The guide sleeve 86 snugly embraces the detent 68 in cam slot 58 to hold pin 56 in neutral alignment with detent 68. This maintains pin 56 in the neutral position within cam slot 58. The cover 26 is then inserted on body 28 as shown in FIG. 4 with the guide sleeve 86 protruding through aperture 80. The bolts 84 (see FIG. 7) are then tightened to lock the control cover in place. The guide sleeve 86 is then vertically removed and the plug 82 is used to close the aperture 80. The control handle 78 can then be used to stroke the linkage.

It should be noted that the spool 30 is moved to a neutral porting position after the guide sleeve 86 is used to align the cover 26. As described above, the guide sleeve 86 is used to align the pin 56 with detent 68 in the center of the cam deadband before the spool 30 is adjusted to neutral. After the guide 86 is removed, and the cover 26 is secured to the housing, then the adjustment screw 40A is used to move the spool via the linkage to a neutral porting position.

The spring 32 acts in conjunction with spool 30 to serve as a backlash spring that takes out the tolerance in all the linkage joints between the spool 30 and the cam 60. This loads the pin 56 to one side of the cam slot 58 so that the pin will not hang up in the detent 68 when the handle 78 is operated during the normal operation of the vehicle. Again, the guide sleeve 86 ensures that all of the linkage between the spool 30 and the cam 60 are in a neutral position when the cover 26 is mounted on the body 28.

It is therefore seen that the device of this invention will achieve at least its stated objectives.

I claim:

1. A method of assembling a control assembly having a body member with a cover member securable to said body member, said cover member having an access aperture therein, said access aperture being in substantial alignment with a second upstanding pin on linkage means disposed within said body member the method comprising:

placing an elongated alignment tool on said second upstanding pin;

placing said cover member on said body member and extending said tool through said access aperture;

securing said cover member to said body member; and removing said alignment tool.

\* \* \* \* \*